Feb. 16, 1932.  W. L. HANCOCK  1,845,873
DISTRIBUTOR FOR COTTON GINS
Filed March 14, 1930  2 Sheets-Sheet 1
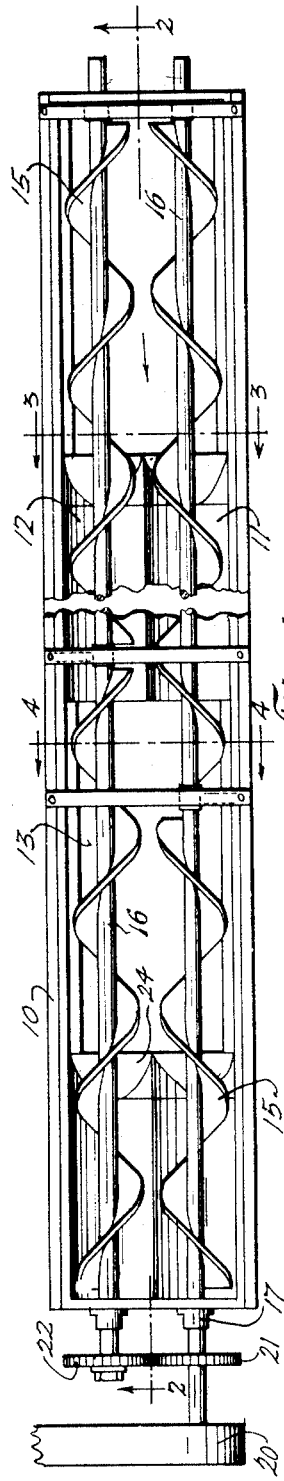
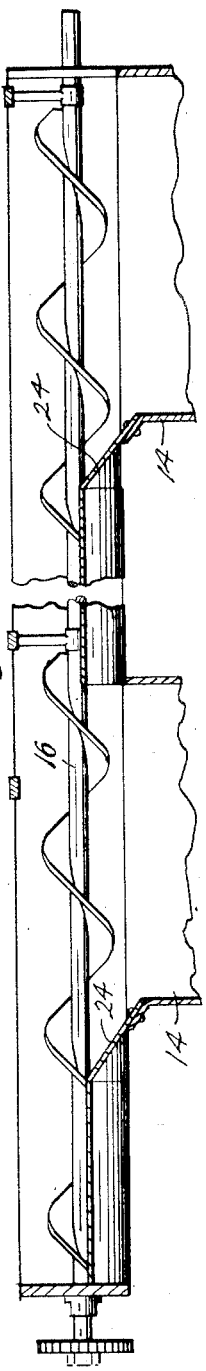
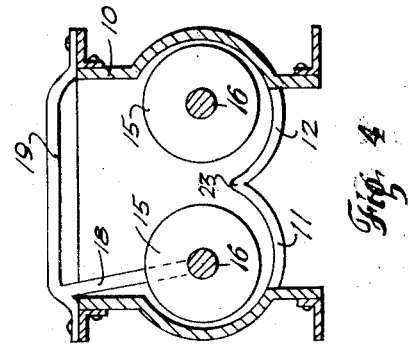
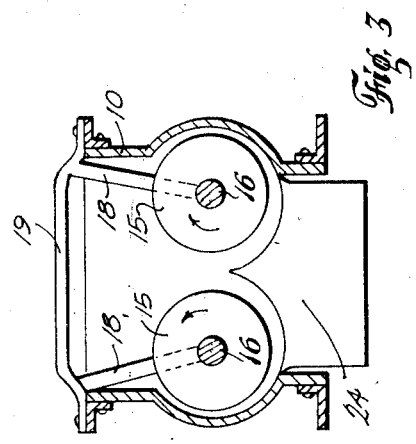
Inventor
William L. Hancock
By
Jack A. Schley
Attorney Inventor
William L. Hancock
By Jack A. Schley
Attorney Patented Feb. 16, 1932

1,845,873

UNITED STATES PATENT OFFICE

WILLIAM L. HANCOCK, OF DALLAS, TEXAS, ASSIGNOR TO THE MURRAY COMPANY, OF DALLAS, TEXAS, A CORPORATION OF TEXAS

DISTRIBUTOR FOR COTTON GINS

Application filed March 14, 1930. Serial No. 435,681.

This invention relates to new and useful improvements in distributors for cotton gins.

It has been the general practice to distribute the seed cotton to gins by means of a spiked belt and such belts are not only expensive to manufacture, install and maintain, but are the source of much trouble in the operation of the gin plant.

Some of the objections to a distributor belt are: choking, breaking off of the spikers, wearing of the drag boards, fire hazard, power consumption and wear and tear.

One object of the invention is to provide a conveyor distributor wherein oppositely revolving screw conveyors are mounted in parallel troughs so as to propel or push the mass of cotton seed rather than drag it.

Another object of the invention is to so mount the conveyors in elongated troughs as to prevent clogging.

A further object of the invention is to provide a distributor whereby a continuous and even feed of the seed cotton is had.

Another object of the invention is to provide a cotton feeding means for a plurality of gin stands, whereby when one of the feeder hoppers of a stand is full the surplus of cotton will be carried or propelled over said full hopper and not drag over it as is the case with a spiked belt distributor.

A construction designed to carry out the invention will be hereinafter described together with other features of the invention.

Figure 5:
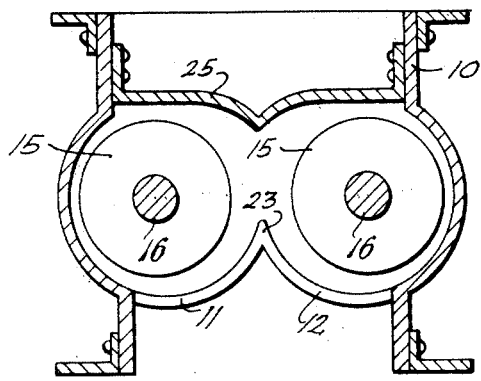
Figure 6:
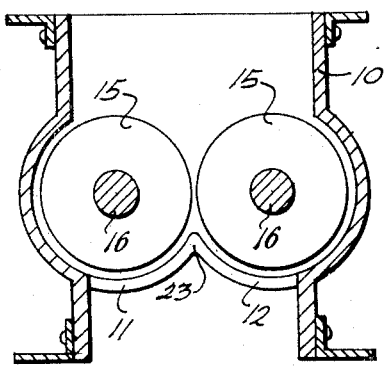
Figure 7:
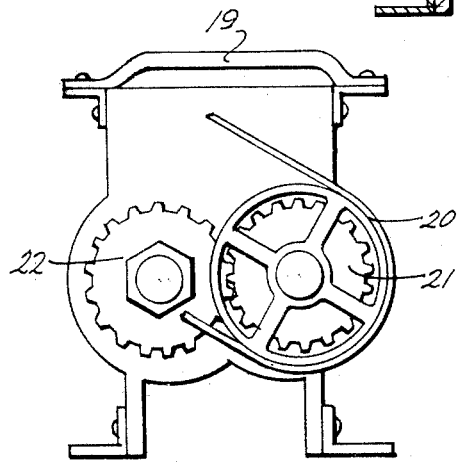

The invention will be more readily understood from a reading of the following specification and by reference to the accompanying drawings in which an example of the invention is shown, and wherein:

Figure 1 is a plan view of a distributor constructed in accordance with the invention, Figure 2 is a longitudinal sectional view taken in the line 2—2 of Figure 1, Figure 3 is a transverse sectional view taken on the line 3—3 of Figure 1, Figure 4 is a transverse sectional view taken on the line 4—4 of Figure 1, Figure 5 is a transverse sectional view of a modified form of the invention, Figure 6 is a transverse section view of a modified form, and Figure 7 is an end view.

In the drawings the numeral 10 designates an elongated conveyor casing having in its bottom a pair of longitudinal parallel troughs 11 and 12, respectively. These troughs are concaved in cross section and constitute the bottom of the casing and may be suitably secured therein. The troughs are provided with spaced discharge openings 13, which are located over the feed hoppers 14 of the cotton feeders for the individual gin stands (not shown), any number of which may be used.

In each trough is mounted a screw conveyor 15, each having its shaft 16 mounted in bearing boxes 17 at the ends of the casing. Intermediate its ends each conveyor shaft is supported in bearing hangers 18 depending from arched bars 19 extending across the top of the casing. It is necessary to make a gap in the screw of the conveyor where the hanger engages the shaft. It will be noted that the hangers 18 are in staggered relation because if they were disposed oppositely they would impede the progress of the cotton and cause clogging.

One of the shafts has a driven pulley 20 and a gear 21 fastened thereon. This gear meshes with and drives a gear 22 fastened on the projecting end of the other shaft. By revolving these conveyors in opposite directions so as to turn away from each other, the tendency is to lift the cotton at the same time it is propelled forwardly. This tends to lift the cotton out of the bottoms of the troughs and more or less carry it along the ridge 23 between the conveyors. This action is very important because it prevents packing the cotton and dragging it.

In Figures 1 and 2 the cotton travels in the direction of the arrow, and when arriving over one of the openings 13 will of course fall through into the hopper 14. When the hopper is full the surplus cotton will ride up inclined guides 24 at the far ends of the openings 13 and will be carried to the next discharge opening. It would, of course, be possible to revolve the screw conveyors 15 toward each other and still propel the cotton, but this would have a tendency to crowd it down into the troughs and pack it, whereas by driving the conveyors away from each other the tendency is to lift the cotton and to fluff it.

In Figure 5 I have shown a guard 25 over the conveyors 15 so that where they are revolved at a comparatively high speed the cotton would be deflected back into the space between the conveyors. In Figure 6 the conveyors are shown closer together and the ridge 23 has been lowered. In some instances this structure has given better results than by spacing the conveyors apart.

Various changes in the size and shape of the different parts, as well as modifications and alterations, may be made within the scope of the appended claims.

What I claim, is:

1. In a cotton distributor, an elongated casing having spaced discharge openings in its bottom, a pair of parallel screw conveyors disposed longitudinally of the casing for propelling cotton and discharging it through said openings, characterized by revolving the adjacent sides of the screw conveyors away from each other and upwardly, whereby the cotton is lifted as it is conveyed forwardly and held in a state of suspension while being conveyed, and a deflector guard located above the conveyors.

2. In a cotton distributor, an elongated casing having spaced discharge openings in its bottom, and a pair of parallel screw conveyors disposed longitudinally of the casing for propelling cotton and discharging it through said openings, the adjacent sides of the screw conveyors revolving away from each other and upwardly whereby the cotton is lifted as it is conveyed forwardly and held in a state of suspension while being conveyed.

In testimony whereof I affix my signature.

WILLIAM L. HANCOCK.